US009829349B2

(12) United States Patent
Sakai et al.

(10) Patent No.: US 9,829,349 B2
(45) Date of Patent: Nov. 28, 2017

(54) METHOD OF COMPENSATING COMMAND VALUE FOR ROTATION ANGLE

(71) Applicant: DMG MORI SEIKI CO., LTD., Nara (JP)

(72) Inventors: Shigetsugu Sakai, Nabari (JP); Yohei Shinkai, Iga (JP); Yutaka Ido, Iga (JP); Masanobu Nakazaki, Kyoto (JP)

(73) Assignee: DMG MORI SEIKI CO., LTD., Yamatokoriyama-Shi, Nara (JP)

( * ) Notice: Subject to any disclaimer, the term of this patent is extended or adjusted under 35 U.S.C. 154(b) by 82 days.

(21) Appl. No.: 14/287,886

(22) Filed: May 27, 2014

(65) Prior Publication Data

US 2014/0354267 A1 Dec. 4, 2014

(30) Foreign Application Priority Data

May 29, 2013 (JP) ................................ 2013-113117

(51) Int. Cl.
*G01B 7/30* (2006.01)
*G01D 5/244* (2006.01)

(52) U.S. Cl.
CPC ................................ *G01D 5/2449* (2013.01)

(58) Field of Classification Search
CPC ............................................... G01R 31/31715
USPC ..................................... 324/207.12; 702/105
See application file for complete search history.

(56) References Cited

U.S. PATENT DOCUMENTS

| 5,841,668 A * | 11/1998 | Pahk .................... G05B 19/404 |
| | | 33/503 |
| 6,931,957 B2 * | 8/2005 | Saito ....................... F16H 59/70 |
| | | 74/335 |
| 7,659,713 B2 * | 2/2010 | Nakata ................. G01D 5/2449 |
| | | 324/207.12 |
| 2003/0135314 A1 | 7/2003 | Saito et al. |
| 2003/0221670 A1 | 12/2003 | Wayama |
| 2004/0232908 A1 | 11/2004 | Saito |

(Continued)

FOREIGN PATENT DOCUMENTS

| JP | 05-288573 A1 | 11/1993 |
| JP | 2001277075 A | 10/2001 |

(Continued)

*Primary Examiner* — Melissa Koval
*Assistant Examiner* — Rahul Maini
(74) *Attorney, Agent, or Firm* — IP Business Solutions, LLC (57) ABSTRACT

There is provided a method of compensating a command value for rotation angle capable of precisely compensating a command value for rotation angle even when conditions at detection differ to thereby make error patterns different in the case where a tooth-to-tooth period error pattern in an arbitrary tooth period is used for all the tooth periods to correct a command value for rotation angle. A forward direction tooth-to-tooth period error pattern being an error pattern of detected rotation angles at forward rotation and the actual rotation angles and a backward direction tooth-to-tooth period error pattern being an error pattern at backward rotation are found, and the command value for rotation angle is corrected based on the error pattern at the time of forward rotation, and the command value for rotation angle is corrected based on the error pattern at the time of backward rotation.

2 Claims, 8 Drawing Sheets

(56) References Cited

U.S. PATENT DOCUMENTS

| | | |
|---|---|---|
| 2005/0062468 A1 | 3/2005 | Wayama |
| 2005/0236219 A1 | 10/2005 | Saito et al. |
| 2007/0200560 A1 | 8/2007 | Saito et al. |
| 2007/0205762 A1 | 9/2007 | Nakata et al. |
| 2011/0320154 A1* | 12/2011 | Wakizaka .............. G01D 5/145 |
| | | 702/94 |

FOREIGN PATENT DOCUMENTS

| | | |
|---|---|---|
| JP | 2003189546 A | 7/2003 |
| JP | 2004003404 A | 1/2004 |
| JP | 2004340873 A | 12/2004 |
| JP | 2007232617 A | 9/2007 |
| JP | 2011-141247 A | 7/2011 |

* cited by examiner

| ERROR COMPENSATION TABLE T | | ERROR COMPENSATION TABLE T' | |
|---|---|---|---|
| COMPENSATION DIVIDING POINT | COMPENSATION VALUE | COMPENSATION DIVIDING POINT | COMPENSATION VALUE |
| 0 | : | 0 | : |
| 1 | : | 1 | : |
| 2 | : | 2 | : |
| 3 | -0.003deg | 3 | : |
| 4 | 0.005deg | 4 | : |
| 5 | : | 5 | : |
| : | : | : | : |
| : | : | : | : |
| 11 | : | 11 | : |

METHOD OF COMPENSATING COMMAND VALUE FOR ROTATION ANGLE

BACKGROUND OF THE INVENTION

1. Field of the Invention

The present invention relates to a method of compensating, when a rotating shaft of, for example, a machine tool is positioned at a predetermined angular position, a command value for rotation angle given to the rotating shaft based on an error between, of the rotating shaft, a detected rotation angle detected by a detection device and an actual rotation angle.

2. Description of the Related Art

When a rotating shaft of a machine tool, for example, a lathe's spindle to which a chuck is loaded is brought to and positioned at a predetermined angular position, the spindle is rotationally driven so that a detected rotation angle of the spindle detected by a rotation angle detection device may agree with a command value for rotation angle.

As the aforesaid conventional rotation angle detection device for the spindle, for example, there is one that uses a detection target gear attached to a spindle and having a plurality of teeth formed at a predetermined pitch and a magnetic detection device fixedly disposed at a position facing the teeth of the detection target gear and outputting a voltage signal according to its distance to the teeth (see, for example, Japanese Patent Application Laid-open No. Hei 05-288573).

However, the aforesaid conventional detection device has a problem that between the actual rotation angle of the spindle and the detection value by the detection device, a rotation period error in one rotation of the detection target gear ascribable to the deviation of the center of the detection target gear or the like occurs, and in addition, a tooth-to-tooth period error ascribable to machining accuracy of the teeth of the detection target gear or the like occurs in each tooth-to-tooth period.

As for the compensation of the rotation period error, it is possible to realize the compensation by previously finding detection errors of the detection device at compensation dividing points dividing a rotation period) (360°) of the detection target gear into a plurality of segments and by compensating a command value for rotation angle based on the errors.

On the other hand, as for the compensation of the tooth-to-tooth period error, there arises a problem that currently available rotation angle positioning devices cannot cope with the compensation because the number of decimal places of an interval (deg) between the compensation dividing is points in a tooth-to-tooth period is too large. Further, when the aforesaid method of compensating the rotation period error is adopted as it is for the compensation of the tooth-to-tooth period error, there arises a problem that too large a number of the compensation points hinder the processing.

Thus, the present applicant has found out that a tooth-to-tooth period error pattern presents substantially the same tendency in all the tooth-to-tooth periods and based on this finding, has proposed a method in which a tooth-to-tooth period error pattern in an arbitrary tooth-to-tooth period is employed for all the tooth-to-tooth periods to correct the command value for rotation angle, and thereby the number of the error compensation points can be greatly reduced and only a small memory capacity is required (see Japanese Patent Application Laid-open No. 2011-141247).

SUMMARY OF THE INVENTION

By the way, the inventor of the present application has found out that there is a problem that an error pattern of, of the rotating shaft, actual rotation angles and detection values by the magnetic detection device sometimes varies depending on the condition at detection. That is, as for the aforesaid tooth-to-tooth period error pattern, the inventor of the present application has found out that there is a problem that the aforesaid tooth-to-tooth period error pattern varies depending on the condition at detection, for example, when the rotation direction of the detection target gear is a forward direction and when the rotation direction of the detection target gear is a backward direction.

The present invention has been made in consideration of the aforesaid circumstances, and has an object to provide a method of compensating a command value for rotation angle that is capable of precisely compensating a command value for rotation angle even when conditions at detection differ in the case where a tooth-to-tooth period error pattern in an arbitrary tooth-to-tooth period is used for all the tooth-to-tooth periods to correct a command value for rotation angle.

The present invention is a method of compensating a command value for rotation angle including: detecting a rotation angle of a detection target gear having a plurality of teeth formed on an outer circumference thereof at a predetermined pitch and attached to a rotating shaft by using a magnetic detection device disposed to face the teeth; and compensating a command value for rotation angle given to the rotating shaft based on an error between the detected rotation angle detected by using the magnetic detection device and an actual rotation angle, the method of compensating the command value for rotation angle including:

detecting errors between the detected rotation angles and the actual rotation angles for a tooth under different conditions to find an individual error pattern under each different condition; and under a predetermined condition, compensating the command value for rotation angle based on an individual error pattern corresponding to the predetermined condition.

The inventor of the present application has found out that a tooth-to-tooth period error pattern being errors between detected rotation angles and actual rotation angles at points between two arbitrary adjacent teeth of the detection target gear sometimes varies depending on the condition at detection, and has completed the present invention based on this finding.

That is, according to the present invention, the individual error pattern under each different condition is found, and under a predetermined condition, the command value for rotation angle is corrected under an individual error pattern corresponding to the predetermined condition, so that even when the error patterns differ because the conditions at rotation angle detection differ, the command value for rotation angle can be corrected precisely, resulting in that it is possible to increase the indexing and positioning precision of the rotating shaft.

In a preferable embodiment of the present invention, the method of compensating the command value for rotation angle is characterized in that rotation of the rotating shaft in a forward direction and rotation of the rotating shaft in a backward direction are the different conditions, the method of compensating the command value for rotation angle further includes: finding a forward direction error pattern for a tooth at forward direction rotation and finding a backward direction error pattern for a tooth at backward direction rotation; and compensating the command value for rotation angle based on the forward direction error pattern at the time of forward direction rotation and compensating the command value for rotation angle based on the backward direction error pattern at the time of backward direction rotation.

In the preferable embodiment, at the time of forward direction rotation of the rotating shaft, the command value for rotation angle is corrected based on the forward direction error pattern, and at the time of backward direction rotation, the command value for rotation angle is corrected based on the backward direction error pattern, so that even when the error patterns differ because the rotation directions differ, the command value for rotation angle can be corrected precisely, resulting in that it is possible to increase the indexing and positioning precision of the rotating shaft.

In another preferable embodiment of the present invention, the method of compensating the command value for rotation angle is characterized in that when atmosphere temperatures differ, the respective atmosphere temperatures are the different conditions, the method of compensating the command value for rotation angle further includes: finding an error pattern for a tooth at each atmosphere temperature; and compensating the command value for rotation angle based on the error patterns corresponding to the respective atmosphere temperatures.

In the other preferable embodiment, the error pattern for a tooth is found at each atmosphere temperature and based on the error patterns corresponding to the respective atmosphere temperatures, the command value for rotation angle is corrected, so that even when the error patterns differ because the atmosphere temperatures differ, the command value for rotation angle can be corrected precisely, resulting in that it is possible to increase the indexing and positioning precision of the rotating shaft.

DETAILED DESCRIPTION OF THE PREFERRED EMBODIMENT

Hereinafter, an embodiment of the present invention will be explained based on the attached drawings.

FIG. 1 to FIG. 10 are drawings used to explain a rotation angle positioning device of a machine tool that performs a method of compensating a command value for rotation angle according to Example 1 of the present invention.

Figure 1:
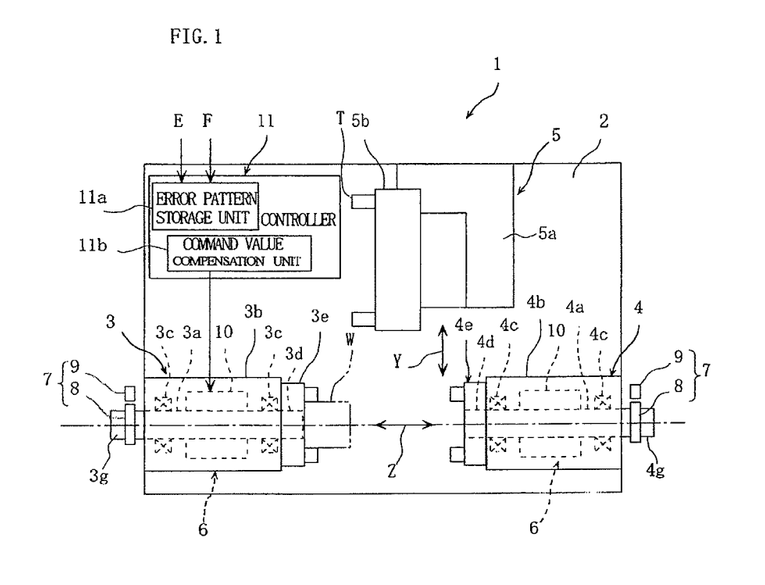
FIG. 1 is a schematic plane view of a machine tool including a rotation angle positioning device to perform a method of compensating a command value for rotation angle according to Example 1 of the present invention.

In the drawings, 1 denotes a turret lathe as an example of the machine tool. The turret lathe 1 includes: a first headstock 3 disposed on a left end portion of a bed 2; a second headstock 4 disposed to face the first headstock 3; and a tool post 5 disposed between and on a rear side of the first and second headstocks 3, 4.

The second headstock 4 is disposed so as to be movable in an axial direction (Z-axis direction), with an axis of its second spindle 4a being coaxial with an axis of a first spindle 3a of the first headstock 3. Further, the tool post 5 has a tool post base 5a disposed to be movable in a Y-axis direction perpendicular to the Z axis and a turret 5b disposed on the tool post base 5a so as to be rotatable around a rotation axis parallel to the Z axis, and a plurality of tools T is installed on the turret 5b.

The first headstock 3 has a first headstock housing 3b fixed on the bed 2 and the first spindle (rotating shaft) 3a rotatably supported by the first headstock housing 3b via a plurality of bearings 3c. Further, a chuck 3e holding an object to be machined (workpiece) W is attached to a tip portion 3d, of the first spindle 3a, projecting from the first headstock housing 3b toward the second headstock 4 side.

The second headstock 4 has a second headstock housing 4b mounted on the bed 2 to be movable in the Z-axis direction and the second spindle (rotating shaft) 4a rotatably supported by the second headstock housing 4b via a plurality of bearings 4c. Further, a chuck 4e holding the object to be machined (workpiece) is attached to a tip portion 4d, of the second spindle 4a, projecting from the second headstock housing 4b toward the first headstock 3 side.

The first headstock 3 and the second headstock 4 include rotation angle positioning devices 6 having the same structure. Hereinafter, the rotation angle positioning device 6 provided on the first headstock 3 will be explained.

The rotation angle positioning device 6 includes: a rotation angle detection device 7 detecting a rotation angle of the first spindle 3a; a driving motor 10 rotating the first spindle 3a so that the rotation angle detected by the rotation angle detection device 7 may become a given command value α for rotation angle; and a controller 11 controlling the driving by the driving motor 10.

The controller 11 includes: an error pattern storage unit 11a storing a rotation period error pattern E and tooth-to-tooth period error patterns F, F', which will be described later; and a command value compensation unit 11b compensating the command value α for rotation angle based on the rotation period error pattern E to find a first corrected command value α1 for rotation angle and further compensating the first corrected command value α1 for rotation angle based on the tooth-to-tooth period error pattern F or F' to find a second corrected command value α2 for rotation angle.

The driving motor 10 is disposed between the first headstock housing 3b and the first spindle 3a and has a function of rotationally driving the first spindle 3a at a high speed and a function of rotationally driving the first spindle 3a by a minute angle.

Figure 2:
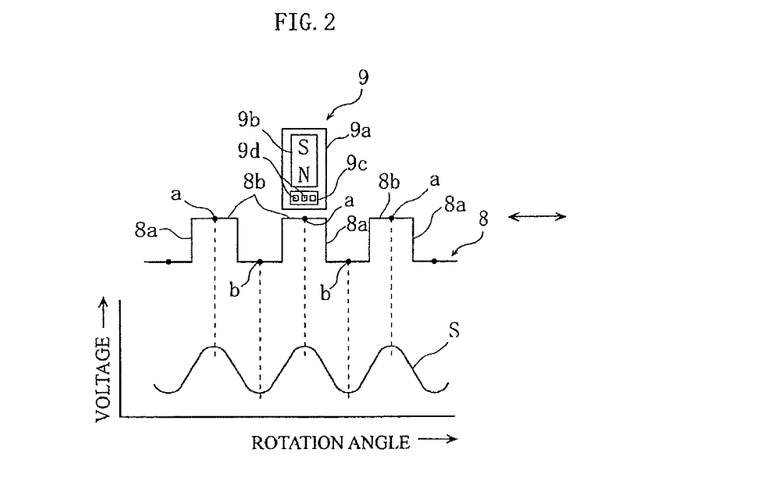
FIG. 2 is a schematic diagram of a rotation angle detection device part of the rotation angle positioning device.

The rotation angle detection device 7 includes: a detection target gear 8 fixed to a rear end portion 3g of the first spindle 3a to rotate with the first spindle 3a; and an angle detection sensor 9 fixedly disposed so as to face the detection target gear 8 in a noncontact state.

The detection target gear 8 is made of a soft magnetic material in an annular shape, with a plurality of (512 in this example) teeth 8a formed at a predetermined pitch on its outer circumferential surface.

The angle detection sensor 9 has: a permanent magnet 9b disposed and fixed in a case 9a made of a nonmagnetic material so as to face tip surfaces 8b of the teeth 8a at a right angle; and a Hall IC 9c disposed and fixed in the case 9a so as to be located between the permanent magnet 9b and the tip surfaces 8b and having a plurality of Hall elements 9d. The permanent magnet 9b is disposed so that its NS polar axis may make a right angle to the tip surfaces 8b, and the Hall IC 9c is disposed on the N-pole side.

In this embodiment, the rotation angle detection device 7 detects the rotation angle of the first spindle 3a by the detection target gear 8 and the angle detection sensor 9. Concretely, as shown in FIG. 2, the angle detection sensor 9 outputs a voltage signal S according to its distance to a facing surface of the detection target gear 8. The magnitude of the voltage signal S is highest when the angle detection sensor 9 faces a rotation-direction center portion a of the tip surface 8b of the tooth 8a, and its value gradually decreases as the position that the angle detection sensor 9 faces goes from here toward a center portion b between the teeth 8a, 8a, and gradually increases as the position that the angle detection sensor 9 faces further goes toward an adjacent tip surface 8b. Therefore, the rotation angle of the first spindle 3a is detected based on the magnitude of the voltage signal S from the angle detection sensor 9.

Then, the first spindle 3a is rotationally driven by the driving motor 10 so that the rotation angle detected by the rotation angle detection device 7 may become a given command value α for rotation angle, and is positioned.

Figure 3:
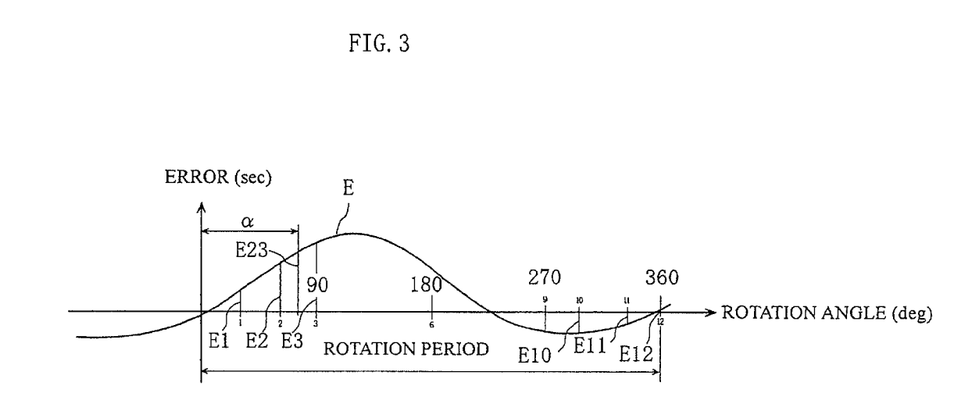
FIG. 3 is a schematic chart of a rotation period error pattern of the rotation angle positioning device.
Figure 4:
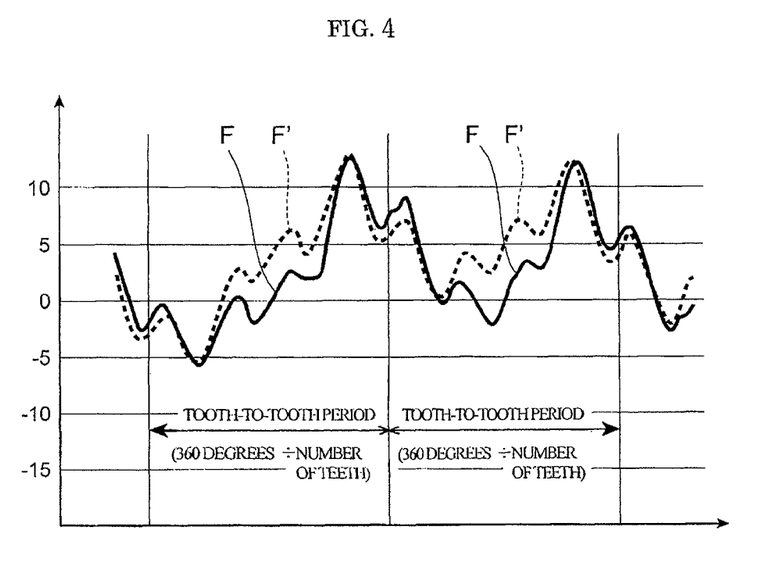
FIG. 4 is a schematic chart of, of the rotation angle positioning device, a forward direction tooth-to-tooth period error pattern F at forward direction (clockwise) rotation and a backward direction tooth-to-tooth period error pattern F' at backward direction (counterclockwise) rotation.

On the other hand, in the rotation angle detection device 7, rotation period errors shown in FIG. 3 sometimes occur due to the deviation of a center position of the detection target gear 8 or the like while the detection target gear 8 rotates once, and tooth-to-tooth period errors shown in FIG. 4 sometimes occur in each tooth-to-tooth period due to machining accuracy of the teeth 8a of the detection target gear 8 or the like.

Therefore, in this embodiment, the command value α for rotation angle is first corrected based on the rotation period error pattern E, to thereby find a first corrected command value α1 for rotation angle, as will be detailed later. Subsequently, the first corrected command value α1 for rotation angle is corrected based on the tooth-to-tooth period error pattern F, to thereby find a second corrected command value α2 for rotation angle.

Then, the driving motor 10 rotationally drives the first spindle 3a so that the rotation angle detected by the rotation angle detection device 7 may agree with the second command value α2 for rotation angle and further the actual rotation angle may agree with the command value α for rotation angle, and the rotation angle positioning of the first spindle 3a is performed.

The rotation period error pattern E is found in the following way. First, as shown in FIG. 3, compensation dividing points 1 to 12 equally dividing a rotation period (360°) of the detection target gear 8 into twelve 30° segments, for example, are found. As for rotation angles corresponding to the respective compensation dividing points 1 to 12, differences between detected rotation angles measured by using the actually adopted angle detection sensor 9 and reference rotation angles measured by using a high-accuracy sensor having sufficiently high resolution are found. Then, the differences at the respective compensation dividing points 1 to 12 are defined as rotation period errors E1, E2, . . . E12, and a curve connecting the rotation period errors E1 . . . E12 is defined as the rotation period error pattern E.

Figure 5:
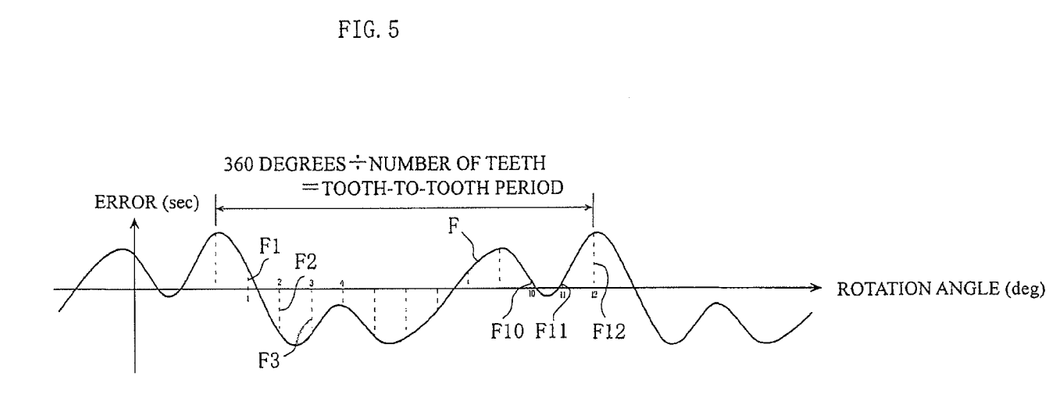
FIG. 5 is a schematic chart used to explain how to find the forward direction and backward direction tooth-to-tooth period error patterns.
Figure 6:
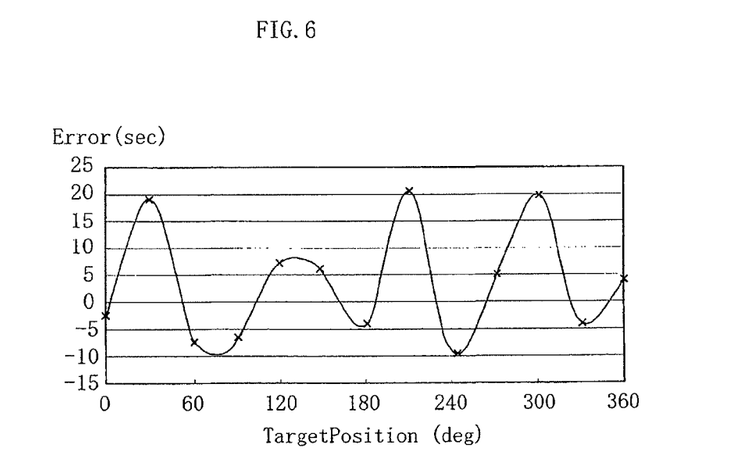
FIG. 6 is a schematic chart of a concrete example of the rotation period error pattern.
Figure 9:
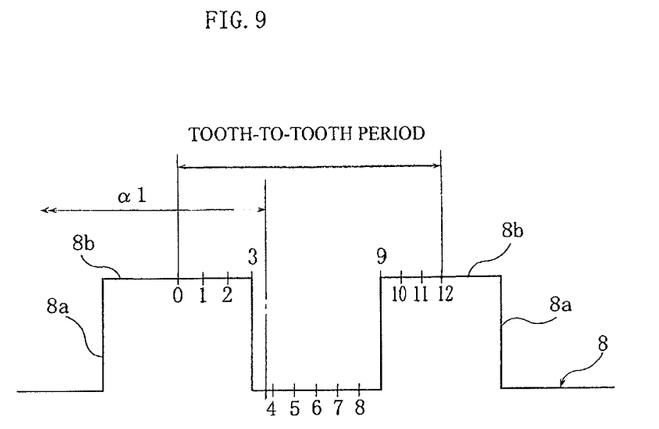
FIG. 9 is a schematic chart used to explain a tooth-to-tooth period adopted in the flowchart.

On the other hand, the tooth-to-tooth period error pattern F is found in the following way. First, when the number of compensation division in a tooth-to-tooth period is 12 as shown in FIG. 5 and FIG. 9, compensation dividing points 1 to 12 equally dividing an interval between arbitrary teeth 8a to 8a into 12 segments are found. As for rotation angles corresponding to the respective compensation dividing points 1 to 12, differences between detected rotation angles measured by using the actually adopted angle detection sensor 9 and reference rotation angles measured by using the high-accuracy sensor having sufficiently high resolution are found. Then, the differences at the respective compensation dividing points 1 to 12 are defined as tooth-to-tooth period errors F1, F2, . . . F12, and a curve connecting the tooth-to-tooth period errors F1 . . . F12 is defined as the tooth-to-tooth period error pattern F.

Figure 7:
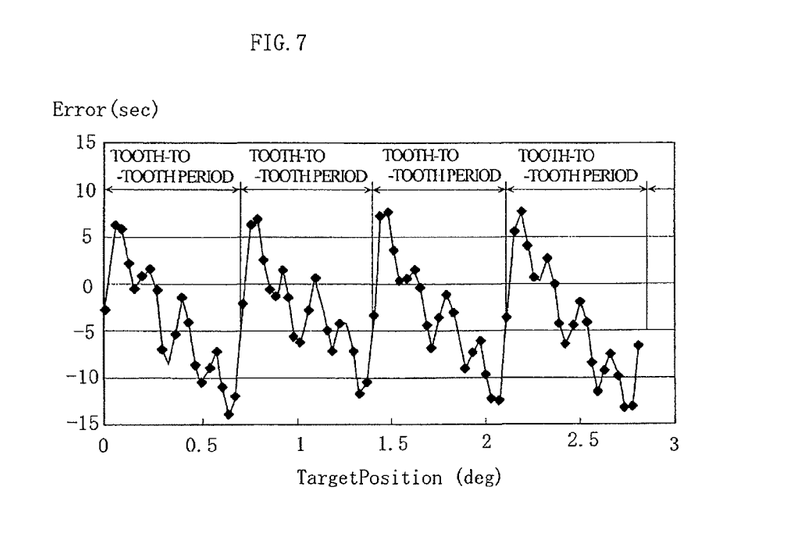
FIG. 7 is a schematic chart of a concrete example of the forward direction tooth-to-tooth period error pattern.

Here, it has turned out that the tooth-to-tooth period error pattern F presents substantially the same tendency in any tooth-to-tooth period as shown in FIG. 4 or FIG. 7, for example. Therefore, in this example, the tooth-to-tooth period error pattern F in an arbitrary tooth-to-tooth period is found, and this pattern F is employed in all the tooth-to-tooth periods.

Therefore, the number of the compensation dividing points for the measurement can only be 12 regardless of the number of the teeth of the detection target gear 8 and can be greatly reduced. Incidentally, if the errors are found by the same method as the method of finding the rotation period error pattern E, the number of compensation dividing points becomes 512×12=6144.

However, as for the tooth-to-tooth period error pattern, it has turned out that the pattern varies depending on the condition at the rotation angle detection. It has turned out that for example, an error pattern obtained by finding rotation angles corresponding to the compensation dividing points 1 to 12 while the first spindle 3a is rotated in the forward direction (clockwise) becomes a forward direction tooth-to-tooth period error pattern F, and on the other hand, an error pattern obtained by finding rotation angles corresponding to the compensation dividing points 1 to 12 while the first spindle 3a is rotated in the backward direction (counterclockwise) becomes a backward direction tooth-to-tooth period error pattern F'. The reason why the detection values of the rotation angle and further the error patters vary depending on the rotation directions is conceivably ascribable to magnetic hysteresis exhibited by the angle detection sensor 9 constituted by the permanent magnet 9b and the Hall IC 9c disposed between the permanent magnet 9b and the tip surfaces 8b and having the plural Hall elements 9d.

Then, the rotation period error pattern E, the forward direction tooth-to-tooth period error pattern F, and the backward direction tooth-to-tooth period error pattern F' are stored in the error pattern storage unit 11a of the controller 11. The command value compensation unit 11b corrects the command value α for rotation angle based on the rotation period error pattern E to find a first corrected command value α1 for rotation angle, and further corrects the first corrected command value α1 for rotation angle by using the forward direction tooth-to-tooth period error pattern F when the rotation direction of the first spindle 3a at the rotation angle detection is the forward direction and corrects the first corrected command value α1 for rotation angle by using the backward direction tooth-to-tooth period error pattern F' when the rotation direction of the first spindle 3a is the backward direction, to thereby find a second corrected command value α2 for rotation angle.

A method of finding the first corrected command value α1 for rotation angle when the command value for rotation angle is α will be explained along with FIG. 3.

α1 is found as follows, where E23 is a compensation value corresponding to the command value α for rotation angle on the rotation period error pattern E.

$$\alpha 1 = \alpha + E23$$

$$E23 = E2 + (E3 - E2) \times (\alpha - 60°)/30°$$

Figure 8:
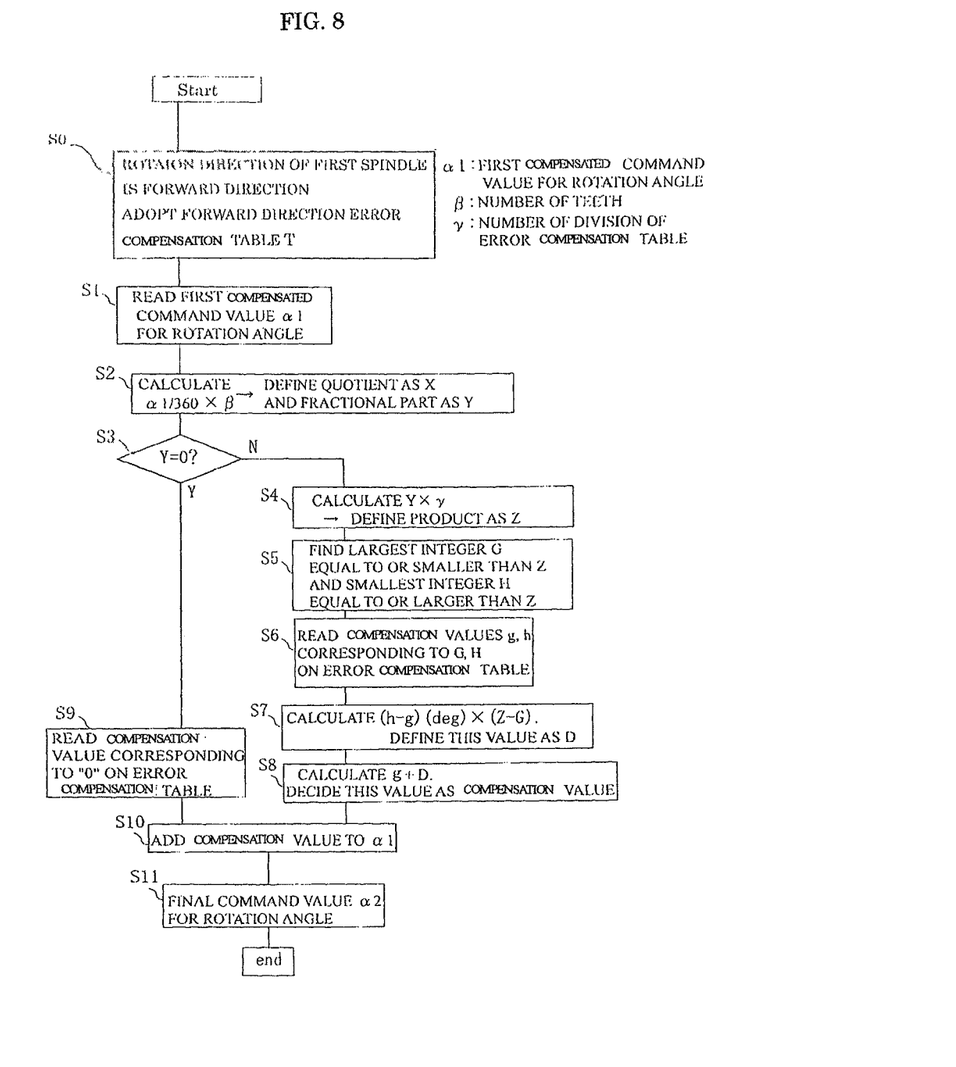
FIG. 8 is a flowchart used to explain the operation of the rotation angle positioning device.

Next, a method of finding the second corrected command value α2 for rotation angle will be more concretely explained based on the flowchart in FIG. 8. In this case, the command value for rotation angle is set to α, the first corrected command value for rotation angle is set to α1, the second corrected command value for rotation angle is set to α2, the number of teeth of the detection target gear 8 is set to β(=512), and the number of division in an error compensation table (the number of compensation dividing points) is set to γ(=12). Further, the rotation direction of the first spindle 3a at the rotation angle detection is set to the forward direction (clockwise).

Figure 10:
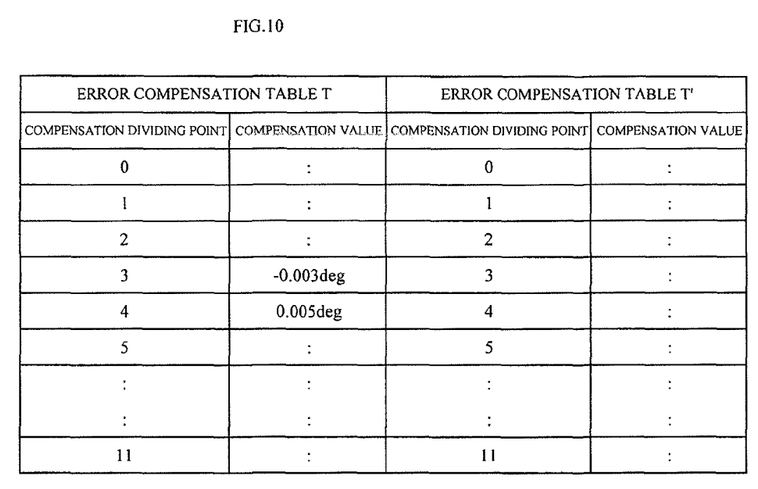
FIG. 10 is a chart showing a tooth-to-tooth period error compensation table adopted in the flowchart.

First, the rotation direction of the first spindle 3a at the rotation angle detection is determined to be the forward direction or the backward direction, and a forward direction error compensation table T in FIG. 10 is adopted because the rotation direction in this example is the forward direction (clockwise) (Step S0). Incidentally, when the rotation direction of the first spindle 3a is the backward direction (counterclockwise), a backward direction error compensation table T' in FIG. 10 is adopted.

Subsequently, the first corrected command value α1 for rotation angle that is the command value α for rotation angle corrected by the aforesaid method is read (Step S1), and how many teeth 8a of the detection target gear 8 the first corrected command value α1 for rotation angle is equivalent to is calculated by (α1/360°)×β (Expression 1). In this case, the quotient (the integral part) of the aforesaid expression 1 is defined as X and the fractional part thereof is defined as Y (Step 2).

When the fractional part (Y) is 0 (Step S3), that is, when the first corrected command value α1 for rotation angle is an angle coinciding with the center portion a of the tip surface 8b of any of the teeth 8a of the detection target gear 8, a compensation value corresponding to the dividing point "0" in the forward direction error compensation table T shown in FIG. 10 is read (Step S9), this compensation value is added to the first corrected command value α1 for rotation angle (Step S10), and the addition result is defined as the final command value for rotation angle (the second corrected command value α2 for rotation angle) (Step S11).

On the other hand, when the Y is not 0 at Step S3, that is, when the first corrected command value α1 for rotation angle is an angle corresponding to a point between any adjacent teeth 8a, 8a, it is first found whether the first corrected command value α1 for rotation angle is located between the adjacent compensation dividing points, and the compensation value is calculated from the forward direction error compensation table T based on this position. Incidentally, when the first corrected command value α1 for rotation angle agrees with any of the compensation dividing points, the compensation value corresponding to this dividing point is added as it is to the first corrected command value α1 for rotation angle.

Concretely, the fractional part (Y)×the number of division (γ) (Expression 2) is calculated and its product is defined as Z (Step S4), and further the largest integer G equal to or smaller than the product Z and the smallest integer H equal to or larger than the product Z are found (Step S5).

Compensation values g, h corresponding to the integers G, H on the forward direction error compensation table T are read (Step S6), subsequently (h−g)×(Z−G) is calculated, its product is defined as D (Step S7), and further the sum of (g+D) is set as the compensation value (Step S8).

Then, the sum of the above compensation value and the first corrected command value α1 for rotation angle becomes the final command value for rotation angle (the second corrected command value α2 for rotation angle) (Steps S10, S11).

More concretely, when at Step S2, the first corrected command value α1 for rotation angle is equivalent to, for example, 99.32 pieces of the teeth of the detection target gear 8, the result at Step S4 is Y×γ=0.32×12=3.84, and the result at Step S5 is such that the largest integer G equal to or smaller than 3.84 is 3 and the smallest integer H equal to or larger than 3.84 is 4, and at Step S6, g=the compensation value corresponding to the dividing point 3=−0.003 (deg) and h=the compensation value corresponding to the dividing point 4=0.005 (deg) are read from the error compensation table in FIG. 10. Subsequently, the result at Step S7 is (h−g)×(Z−G)=(0.005−(−0.003))×(3.84−3)=0.00672=D, at Step S8, g+D=−0.003+0.00672=0.00372 (deg) becomes the compensation value, and the first corrected command value α1 for rotation angle+0.00372 (deg) becomes the final command value for rotation angle (the second corrected command value α2 for rotation angle).

As described above, in this example, the command value a for rotation angle is corrected based on the rotation period error pattern E, to thereby find the first corrected command value α1 for rotation angle, and the first corrected command value α1 for rotation angle is corrected based on the forward direction tooth-to-tooth period error pattern F or the backward direction tooth-to-tooth period error pattern F', to thereby find the second corrected command value α2 for rotation angle, so that it is possible to surely correct an error ascribable to the deviation of the center of the detection target gear 8 or the like and an error ascribable to machining accuracy of the teeth 8a of the detection target gear 8 or the like.

Further, the tooth-to-tooth period error patterns F, F' change due to individual differences of the detection target gear and the angle detection sensor, but it has been found out that with the same detection target gear, the same angle detection sensor, and the same installation condition, substantially the same tendency is presented in any tooth-to-tooth period, and with this point noted, the error compensation table shown in FIG. 10 is created based on the tooth-to-tooth period error pattern F in an arbitrary tooth-to-tooth period, and this table is used for the compensation in all the tooth-to-tooth periods, and therefore, it is possible to greatly reduce the number of the compensation dividing points and only a small memory capacity is required.

Furthermore, it has been found out that the tooth-to-tooth period error pattern varies depending on whether the rotation direction of the first spindle 3a at the rotation angle detection is the forward direction (clockwise) or the backward direction (counterclockwise), and with this point noted, in the case of the forward direction rotation, the forward direction tooth-to-tooth period error pattern F is adopted and in the case of the backward direction rotation, the backward direction tooth-to-tooth period error pattern F' is adopted to correct the command value for rotation angle, so that it is also possible to surely correct an error ascribable to the rotation direction of the first spindle 3a at the rotation angle detection.

Further, the command value α for rotation angle is corrected based on the rotation period error pattern E, to thereby find the first corrected command value α1 for rotation angle, and the first corrected command value α1 for rotation angle is next corrected based on the tooth-to-tooth period error pattern F or F', to thereby find the second corrected command value α2 for rotation angle, and therefore, the compensation of an error ascribable to the deviation of the center of the detection target gear or the like is followed by the compensation of an error ascribable to machining accuracy of the teeth of the detection target gear or the like, resulting in that it is possible to more efficiently and surely correct the both errors.

Incidentally, in the aforesaid example, as an example where the conditions at the rotation angle detection differ, the case where the rotation direction of the rotating shaft at the rotation angle detection is the forward direction and the backward direction has been explained, but the present invention is applicable also to the case where various conditions other than the above differ. For example, when atmosphere temperatures differ, it is also possible that the respective atmosphere temperatures are the different conditions, an error pattern for a tooth is found at each atmosphere temperature, and based on the error patterns corresponding to the respective atmosphere temperatures, the command value for rotation angle is corrected.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A method of compensating a command value for rotation angle in a rotation angle positioning device of a machine tool, the method comprising the steps of:
    detecting a rotation angle of a detection target gear having a plurality of teeth formed on an outer circumference thereof at a predetermined pitch and attached to a rotating shaft by using a magnetic detection device disposed to face the teeth;
    detecting rotation period errors between detected rotation angles and actual rotation angles at compensation dividing points which equally divide a rotation period of the detection target gear, the rotation period errors being detected in one rotation at each detection point of the detection target gear;
    finding a rotation period error pattern defined by a curve connecting the rotation period errors at each detection point of the target gear;
    storing the rotation period error pattern in an error pattern storage unit;
    compensating a command value for rotation angle given to the rotating shaft based on the rotation period error pattern in a command value compensation unit in either a forward direction or a backward direction in which the detection target gear rotates;
    providing a first compensated command value for rotation angle by the step of compensating the command value for rotation angle;
    detecting tooth-to-tooth period errors between the detected rotation angles and the actual rotation angles at compensation dividing points which equally divide an interval between arbitrary tooth, the tooth-to-tooth period errors being detected between two consecutive teeth of the detection target gear;
    finding a tooth-to-tooth period error pattern defined by a curve connecting the tooth-to-tooth period errors by connecting the tooth-to-too period errors; and
    storing the tooth-to-tooth period error pattern in the error pattern storage unit,
    wherein the step of detecting the tooth-to-tooth period errors includes varying the tooth-to-tooth period errors depending on whether the detection target gear rotates in the forward direction rotation or the backward direction rotation,
    the step of finding the tooth-to-tooth period error pattern includes finding at least a first tooth-to-tooth error pattern in a case of the forward direction rotation and a second tooth-to-tooth error pattern in a case of the backward direction rotation, and
    the step of storing the tooth-to-tooth period error pattern includes storing at least the first tooth-to-tooth error pattern in the case of the forward direction rotation and the second tooth-to-tooth error pattern in the case of the backward direction rotation;
    determining whether the first tooth-to-tooth error pattern in the case of the forward rotation or the second tooth-to-tooth error pattern in the case of the backward rotation is to be used;
    compensating the first compensated command value for rotation angle in the command value compensation unit based on one of the first tooth-to-tooth error pattern corresponding to the forward direction rotation and the second tooth-to-tooth error pattern corresponding to the backward direction rotation which is determined by the step of determining; and
    providing a second compensated command value for rotation angle by the step of compensating the first compensated command value for rotation angle based on the first tooth-to-tooth error pattern;
    providing a third compensated command value for rotation angle by the compensating the first compensated command value for rotation angle based on the second tooth-to-tooth error pattern, wherein
    the step of compensating the first compensated command value for rotation angle includes compensating the first compensated command value for rotation angle to obtain the second compensated command value based on the first tooth-to-tooth error pattern at the time of forward direction rotation and compensating the first compensated command value for rotation angle to obtain the third compensated command value based on the second tooth-to-tooth error pattern at the time of backward direction rotation.

2. A method of compensating a command value for rotation angle in a rotation angle positioning device of a machine tool, the method comprising the steps of:

detecting a rotation angle of a detection target gear having a plurality of teeth formed on an outer circumference thereof at a predetermined pitch and attached to a rotating shaft by using a magnetic detection device disposed to face the teeth;

detecting rotation period errors between detected rotation angles and actual rotation angles at compensation dividing points which equally divide a rotation period of the detection target gear, the rotation period errors being detected in one rotation at each detection point of the detection target gear;

finding a rotation period error pattern defined by a curve connecting the rotation period errors at each detection point of the target gear;

storing the rotation period error pattern in an error pattern storage unit;

compensating a command value for rotation angle given to the rotating shaft based on the rotation period error pattern in a command value compensation unit for either a first atmosphere temperature or a second atmosphere temperature;

providing a first compensated command value for rotation angle by the step of compensating the command value for rotation angle;

detecting tooth-to-tooth period errors between the detected rotation angles and the actual rotation angles at compensation dividing points which equally divide an interval between arbitrary tooth, the tooth-to-tooth period errors being detected between two consecutive teeth of the detection target gear;

finding a tooth-to-tooth period error pattern defined by a curve connecting the tooth-to-tooth period errors by connecting the tooth-to-too period errors; and storing the tooth-to-tooth period error pattern in the error pattern storage unit, wherein the step of detecting the tooth-to-tooth period errors includes varying the tooth-to-tooth period errors depending on atmosphere temperature, the step of finding the tooth-to-tooth period error pattern includes finding at least a first tooth-to-tooth error pattern in a case of the first atmosphere temperature and a second tooth-to-tooth error pattern in a case of the second atmosphere temperature, and the step of storing the tooth-to-tooth period error pattern includes storing at least the first tooth-to-tooth error pattern in the case of the first atmosphere temperature and the second tooth-to-tooth error pattern in the case of the second atmosphere temperature;

determining whether the first tooth-to-tooth error pattern in the case of the first atmosphere temperature or the second tooth-to-tooth error pattern in the case of the second atmosphere temperature is to be used;

compensating the first compensated command value for rotation angle in the command value compensation unit based on one of the first tooth-to-tooth error pattern corresponding to the first atmosphere temperature and the second tooth-to-tooth error pattern corresponding to the second atmosphere temperature which is determined by the step of determining; and providing a second compensated command value for rotation angle by the step of compensating the first compensated command value for rotation angle based on the first tooth-to-tooth error pattern, providing a third compensated command value for rotation angle by the step of compensating the first compensated value for rotation angle based on the second tooth-to-tooth error pattern, wherein the step of compensating the first compensated command value for rotation angle includes compensating the first compensated command value for rotation angle to obtain the second compensated command value based on the first error pattern corresponding to the first atmosphere temperature, and the step of compensating the first compensated command value for rotation angle includes compensating the first compensated command value for rotation angle to obtain the third compensated command value based on the second error pattern corresponding to the second atmosphere temperature.

* * * * *